United States Patent [19]

Kahn

[11] Patent Number: 5,475,850
[45] Date of Patent: Dec. 12, 1995

[54] MULTISTATE MICROPROCESSOR BUS ARBITRATION SIGNALS

[75] Inventor: Mitchell A. Kahn, Tempe, Ariz.

[73] Assignee: Intel Corporation, Santa Clara, Calif.

[21] Appl. No.: 80,005

[22] Filed: Jun. 21, 1993

[51] Int. Cl.⁶ .................................................. G06F 13/14
[52] U.S. Cl. .................. 395/290; 395/293; 395/729; 395/800; 364/DIG. 1; 364/242.6; 364/242.92; 364/240.5; 364/243.4
[58] Field of Search ................................... 395/800, 425, 395/375, 725, 550

[56] References Cited

U.S. PATENT DOCUMENTS

| | | | |
|---|---|---|---|
| 5,146,596 | 9/1992 | Whittaker et al. | 395/725 |
| 5,157,774 | 10/1992 | Culley | 395/425 |
| 5,168,568 | 12/1992 | Thayer et al. | 395/725 |
| 5,287,477 | 2/1994 | Johnson et al. | 395/425 |

*Primary Examiner*—Mehmet Geckil
*Attorney, Agent, or Firm*—Blakely, Sokoloff, Taylor & Zafman

[57] ABSTRACT

A microprocessor bus arbitration communications scheme for enhancing efficiency and performance of a multi-master bus system, typically within a computer system, including a central processing unit ("CPU") being a primary bus master, a bus arbiter and at least one alternative bus master coupled together by a bus. The CPU includes an internal memory element, a bus queue and bus control logic which collectively operate to generate a plurality of microprocessor bus arbitration signals to the bus arbiter. These microprocessor bus arbitration signals include a first bus arbitration signal indicating whether the CPU requires access to the bus and a second bus arbitration signal indicating that the CPU requires immediate access to the bus.

9 Claims, 13 Drawing Sheets

MULTISTATE MICROPROCESSOR BUS ARBITRATION SIGNALS

BACKGROUND OF THE INVENTION

1. Field of the Invention

The present invention relates to a bus arbitration communications scheme in a computer system having a multi-master system bus. More particularly, the present invention relates to at least one multistate microprocessor bus arbitration signal between a central processing unit (hereinafter referred to as a "CPU") and an external bus arbiter to indicate how urgent the CPU requires access to the bus.

2. Prior Art

It is commonly known that a multi-master bus is a communication structure connecting many devices such as processors, direct memory access devices (hereinafter referred to as "DMA devices") and other alternate bus masters, each of which are capable of accessing the bus and performing independent data transfers thereon. However, since the bus is a single resource which can transfer only one data element at a time, only one device at a time may have access to the bus. Such device is commonly referred to as a "bus master", which is selected usually by a bus arbiter being coupled to each of the devices through bus arbitration signals.

An example of conventional bus arbitration signals used to allocate control of a multi-master bus system is shown in FIG. 1, which illustrates a CPU 1, external main memory 2 and at least one alternate bus master 3, such as a DMA device, coupled together through a system bus 4. An external bus arbiter 5 is electronically coupled to the CPU 1 and the alternate bus master 3 in order to receive bus requests from the CPU 1 and the alternate bus master 3 and to grant such devices access to the system bus 4. Although FIG. 1 merely shows the external system bus 4 having at least two possible bus masters, namely the CPU 1 and the at least one alternate bus master 3, the system bus 4 is capable of supporting many different types of bus masters such as, for example, auxiliary processors.

The CPU 1 is coupled to the external bus arbiter 5 through three microprocessor bus arbitration signal lines; namely, a hold signal 8a, a hold acknowledge signal 8b and a bus request signal 8c referred to in this application as HOLD, HOLDA and BREQ respectively. The HOLD signal 8a is an input signal from the bus arbiter 5 into the CPU 1 indicating that one of the alternate bus masters 3 is attempting to access the system bus 4. The HOLDA signal 8b is an output signal from the CPU 1 into the bus arbiter 5 to acknowledge receipt of the HOLD signal 8a and to indicate that the CPU 1 does not currently require access to the bus 4. Finally, the BREQ signal 8c is a bus request signal outputted from the CPU 1 into the bus arbiter 5 which indicates that the CPU 1 requires access the system bus 4. Although not shown, similar arbitration signal lines would be implemented between any auxiliary processor coupled to both the external system bus 4 and the external bus arbiter 5.

With respect to the at least one alternate bus master 3, each of the alternate bus masters are coupled to the external bus arbiter 5 through two bus arbitration signal lines. For example, the first alternate bus master has a bus request ("REQ") 9a and a bus acknowledge ("ACK") 9b. The REQ signal 9a is inputted into the bus arbiter 5 from the first alternate bus master 3a in order to request access of the system bus 4 so that it can perform its services. The ACK signal 9b is outputted into the first alternate bus master 3a from the bus arbiter 5 to notify that it may begin accessing the bus 4 to transfer data thereon.

The above-mentioned conventional arbitration signal lines enable many devices to share a common system bus to perform independent data transfers. The operation of the above bus arbitration signals of the computer system shown in FIG. 1 as well as other bus arbitration signals further referenced in this application are simply considered to be "active high", although such signals may be implemented to be "active low".

Generally, an alternate bus master, such as the first alternate bus master 3a, requests control of the system bus 4 by first sending an active REQ signal 9a to the external bus arbiter 5. Upon receiving the active REQ signal 9a, the bus arbiter 5 sends an active HOLD input signal 8a to the CPU 1 to indicate that the first alternate bus master 3a is requesting control of the system bus 4. Thereafter, the HOLDA signal 8b is outputted from the CPU 1 to the bus arbiter 5 acknowledging that it has relinquished control of the system bus 4 to the first alternate bus master 3a and, as a result, the CPU 1 floats its address, data and control pins. Upon receipt of the HOLDA signal 8b, the bus arbiter 5 inputs the active ACK signal 9b into the first alternate bus master 3a indicating that it can access the system bus 4. If the CPU 1 needs to regain access to the system bus 4, it sends an active BREQ signal 8c to the external bus arbiter 5.

The CPU 1, as most high end processors used today, has an internal instruction/data cache 6 and an internal bus queue 7. An instruction/data cache 6 allows the CPU 1 to temporarily store instructions and data fetched from external main memory 2 to streamline instruction execution by reducing the number of instruction and data fetches required to execute a program. Therefore, the CPU 1 is capable of executing code without continually accessing the system bus 4.

A bus queue 7, on the other hand, enables the bus arbiter 5 to defer servicing a bus request from the CPU 1 if the CPU 1 can continue executing code instructions from the cache 6. However, this feature is not used to its full capability in a computer system using a conventional microprocessor bus arbitration communication scheme because the BREQ signal 8c indicates that the CPU 1 needs access to the system bus 4, but it does not provide sufficient information for the bus arbiter 5 to determine how urgently such access is needed (i.e., whether access can be granted after an alternate bus master finishes its data transfers).

As shown in FIG. 1, there does not currently exist any conventional multistate microprocessor bus arbitration signals which prioritize the urgency in which the CPU 1 requires access to the system bus 4. Thus, bus arbiters which control multi-master buses are commonly designed to grant access to the CPU 1 immediately after it receives the active BREQ signal 8c. As a result, the bus 4 is inefficient, especially in I/O intensive systems having many alternate bus masters because the CPU's request is more likely to disrupt another bus master's operations (e.g., the operations of the first alternate bus master 3a) even when the CPU 1 does not immediately require bus access. Furthermore, a computer system which requires alternate bus masters to immediately return access of the system bus 4 to the CPU 1 upon receipt of an active BREQ signal 8c is more likely to experience information loss resulting in a decrease in system performance.

Hence, it would be desirable to implement at least one multistate microprocessor bus arbitration signal to provide the bus arbiter with sufficient information to intelligently allocate access to the external system bus in order to increase its efficiency and performance.

Accordingly, it would be a great advantage and is therefore an object of the present invention to provide at least one multistate microprocessor bus arbitration signal to enable the external bus arbiter to determine how urgently the CPU requires access to the system bus.

Another object of the present invention is to provide a method and apparatus for increasing efficiency of a multi-master bus system.

A further object of the present invention is to provide a method and apparatus for increasing performance of a multi-master bus system.

BRIEF SUMMARY OF THE INVENTION

The present invention relates to an apparatus and method for efficiently allocating access to an external system bus between at least one microprocessor, direct memory access devices or any other possible alternative bus master. More particularly, the present invention relates to a bus arbitration communications scheme in a multi-master bus system between a CPU and a controlling device, such as a bus arbiter, in which the bus arbitration communication scheme comprises means for signaling the controlling device to generate a bus arbitration signal to indicate whether a bus request by the CPU has greater or lesser priority than concurrent tasks being performed by an alternate bus master.

In a method for the signaling operation of the present invention in which the CPU provides the bus arbiter priority information regarding access to the system bus, the following method is followed. First, the microprocessor bus arbitration signals BREQ and BSTALL are initialized. When the CPU requests access to the system bus, the bus request is loaded into an internal bus queue and the CPU monitors whether it can continue to execute its next code instruction without accessing the external system bus. If so, the BREQ signal is activated signaling that the internal bus queue contains a bus request, but BSTALL remains inactive indicating that the CPU's bus request does not require immediate servicing if an alternate bus master has access to the external system bus. In other words, the system bus may be designed in such a manner that the CPU's bus request has a lesser priority than the alternate bus master's bus request. Such monitoring continues for each successive code instruction until the CPU gains access to the bus to service the bus requests thereby deactivating the BREQ signal. However, if the CPU requires immediate access to the bus because it cannot continue to execute code, BSTALL is activated causing a bus arbiter to clear the bus so as to give access to the CPU.

BRIEF DESCRIPTION OF THE DRAWINGS

The objects, features and advantages of the present invention will become apparent from the following detailed description of the present invention in which.

DETAILED DESCRIPTION OF THE INVENTION

An apparatus and method is described for efficient operation of a multi-master bus system by including at least one multistate microprocessor bus arbitration signal coupled to a microprocessor and a bus arbiter in order to assist the bus arbiter in determining how urgent the microprocessor requires access to the system bus. In the following detailed description, numerous specific details are set forth, such as specific bus arbitration line configurations. Moreover, a specific example has been created for the sole purpose of illustrating the operation of the present invention, but is in no way a limitation on the scope of the present invention.

The present invention can be implemented as at least one pin in the microprocessor, an incremented clock pulse or any variation of a status signal pin of the microprocessor. It is apparent, however, to one skilled in the art that the present invention may be practiced without incorporating a specific implementation and thus, the application will discuss the output of the implementation, a signal, rather than the manner of implementation. It should be borne in mind that the present invention need not be limited for use between a microprocessor and a bus arbiter, but may find wide application for establishing an informative communication link between the bus arbiter and any alternate bus master.

Figure 1:
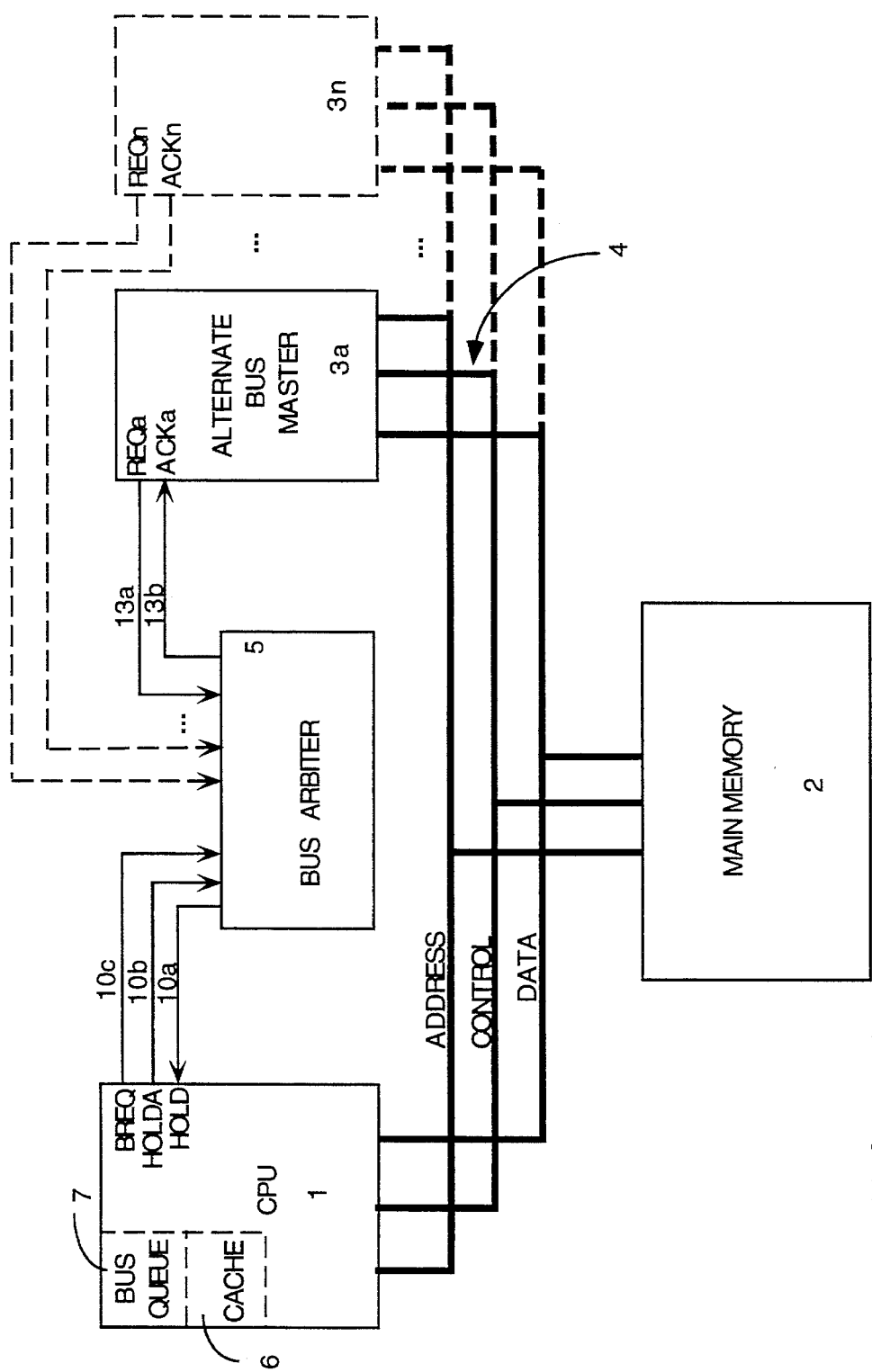
FIG. 1 is a block diagram of a computer system incorporating a conventional bus arbitration communication scheme.

As previously discussed herein, FIG. 1 illustrates a CPU 1, such as an Intel i960 CA processor, external main memory 2 and at least one alternate bus master 3 coupled together through an external system bus 4. An external bus arbiter 5 is electronically coupled to the CPU 1 and at least one alternate bus master 3 in order to receive bus requests from the CPU 1 and the alternate bus master 3 and to grant such devices access to the system bus 4. The bus arbiter 5 is coupled to the CPU 1 through three multistate microprocessor bus arbitration signals called HOLD, HOLDA and BREQ signals.

The HOLD signal 8a and the HOLDA signal 8b provide the CPU 1 and the bus arbiter 5 with a hold/hold acknowledge bus arbitration protocol that signals the CPU 1 that an alternate bus master is attempting to access the system bus 4 and that the CPU 1 does not require such access. The BREQ signal 8c, as previously discussed, is an output signal from the CPU 1 to the bus arbiter 5 which indicates that the CPU 1 needs access the system bus 4 causing the bus arbiter 5 to clear the bus.

With respect to a first alternate bus master 3a, it is coupled to the external bus arbiter 5 through two bus arbitration signal lines called "REQ" 9a and "ACK" 9b. The REQ signal 9a is inputted into the bus arbiter 5 from the first alternate bus master 3a in order to request access of the system bus 4 so that the first alternate bus master 3a can perform certain operations. The ACK signal 9b is activated and outputted from the bus arbiter 5 into the first alternate bus master 3a in order to notify that it may begin accessing the bus 4 to transfer data.

Based on the computer system illustrated in FIG. 1, the bus arbiter controls access to the bus for each bus master, including the CPU 1 and each of the at least one alternate bus masters 3, through multistate bus arbitration signals. In conventional bus arbitration architecture, the bus arbiter 5 provides the CPU 1 access to the external system bus 4 through three multistate microprocessor bus arbitration signals (HOLD, HOLDA and BREQ) and also provides the first alternate bus master 3a, access to the external system bus 4 based on two bus arbitration signals (REQ and ACK). Depending on the values of these bus arbitration signals, the bus arbiter 5 either (i) maintains the bus 4 in an "Idle" state 10, (ii) grants the CPU 1 access to the bus ("CPU controlled state") 11, or (iii) grants one of the alternate bus masters 3 access to the bus ("Alternate Bus Master controlled" state) 12. Such controlling is accomplished according to a state diagram shown in FIG. 2 with reference to components in FIG. 1.

Each of the above-indicated states has two state transitions represented by arrows 13, 14, 15, 16, 17 and 18. Initially, when neither the CPU 1 nor any of the alternate bus masters 3 requires access to the bus 4, the REQ and BREQ signals 9b and 8c are inactive, denoted by arrows 15 and 18, causing the external system bus 4 to rest in the "Idle" state 10. Although it is common that the CPU 1 has access to an external system bus 4 when it is in the "Idle" state, a computer system could be designed so that the alternate bus master 3 controls the system bus in this state. Therefore, bus access during the "Idle" state is system dependent relying on which bus master is determined to have the highest priority. In this example, as in most all computer systems, the CPU 1 is given greater priority over alternate bus masters 3.

The bus arbiter 5 provides the CPU 1 access to the external system bus 4 immediately when the BREQ signal 8c is asserted as shown in state transition 13 and 17, causing the HOLD and ACK signals to become inactive. Similarly, the alternate bus master 3 accesses the bus (ACK=1 and HOLD=1) if the REQ signal of the bus master requesting bus access is activated and the BREQ signal is inactive due to the CPU's most favored status on the bus 4, as illustrated by transitions 14 and 16. As a result, there does not exist a bus arbitration signal which prioritizes bus requests from the CPU or any other processor leading to an inefficient multimaster bus system because, for example, the bus request by the CPU 1 may interrupt a data transfer by any of the at least one alternate bus master 3 even though the CPU 1 does not require immediate access to the bus 4. The present invention has overcome this limitation by providing at least one multistate microprocessor bus arbitration signal to prioritize the CPU's bus requests with respect to a bus request by an alternate bus master.

Figure 3:
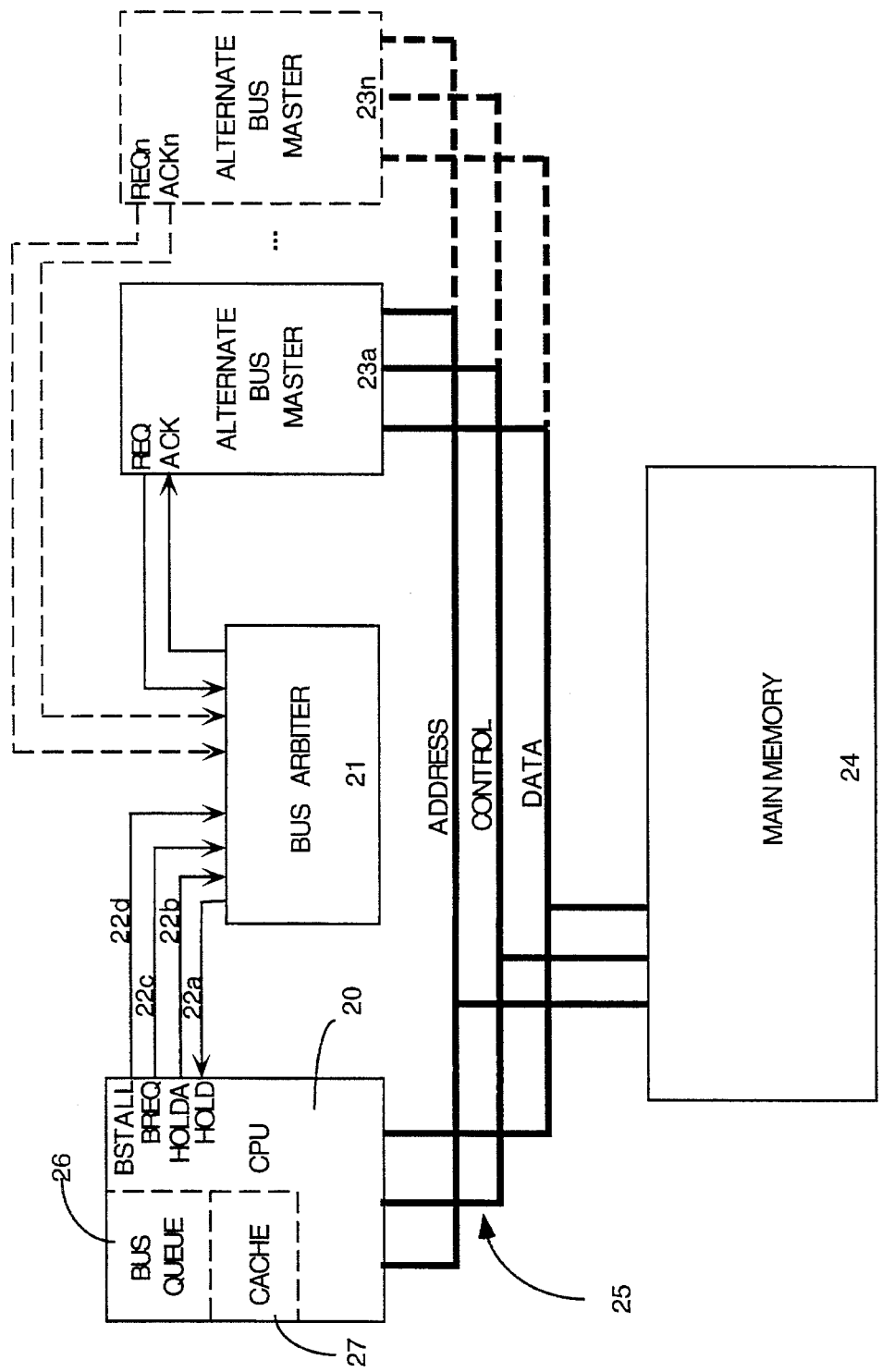
FIG. 3 is a block diagram showing a computer system incorporating one embodiment of the present invention.

FIG. 3 illustrates one embodiment of a computer system in a block diagram form incorporating the present invention. The CPU 21 is electrically coupled to an external bus arbiter 25 through four microprocessor bus arbitration signals 28a–28d, an implementation similar to FIG. 1 but including an additional bus arbitration signal called BSTALL 28d. The BSTALL signal 28d provides information to the bus arbiter 25 that the CPU 21 immediately needs access to the system bus 24 such as when the CPU 21 stalls. A stall condition could be caused by any bus related processor task that blocks the execution of code including, but not limited to, (i) scoreboarded register loads (i.e., attempting to use a register while it is being loaded); (ii) instruction cache misses (i.e., immediately needed instruction fetches); or (iii) bus buffer overrun (i.e., the bus queue is full and the processor generates another request). The BSTALL signal, however, could be configured to assert itself or a concurrent signal as a warning that the CPU may stall soon (e.g., the bus queue is almost full). Such an embodiment will be discussed later as a "high-water mark" implementation.

Figure 2:
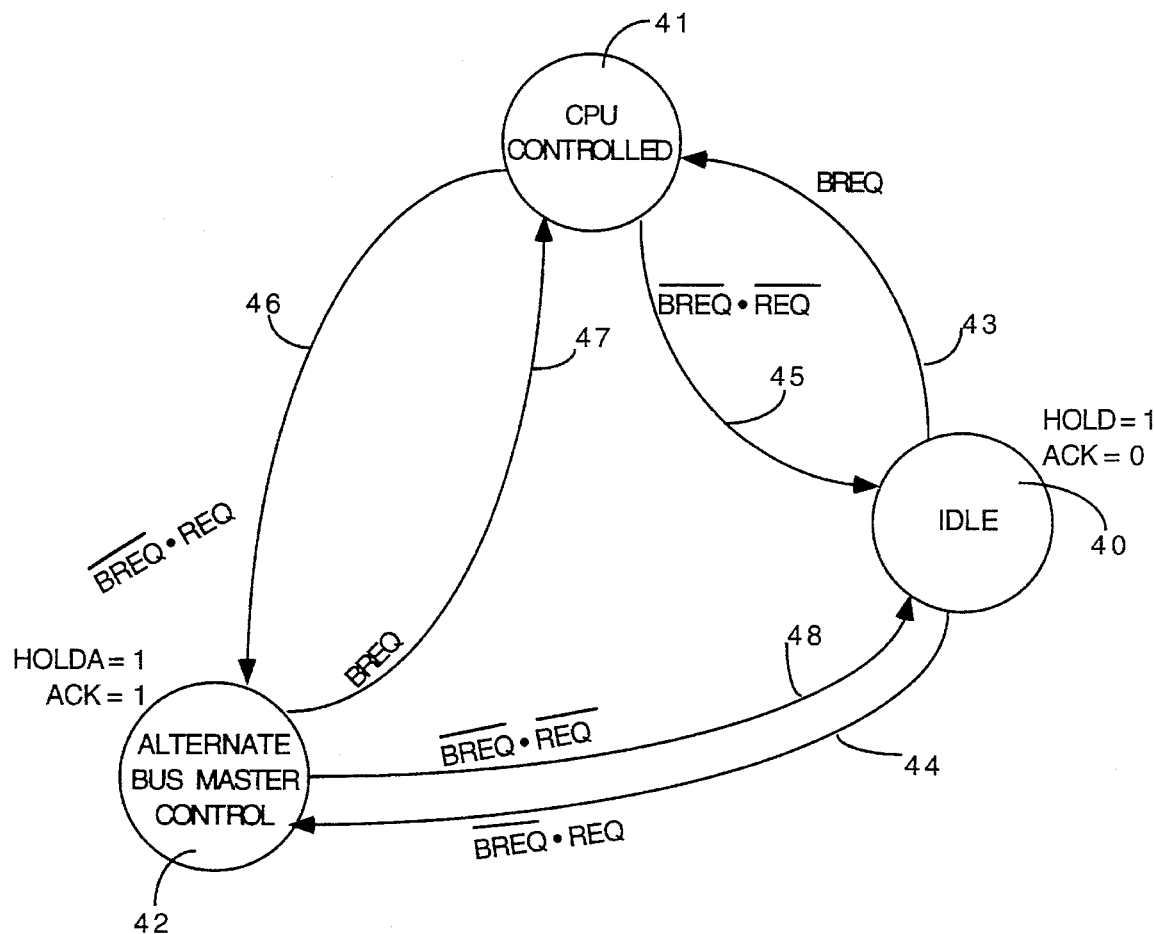
FIG. 2 is a state diagram of the operations of an external bus arbiter with respect to the conventional bus arbitration communication scheme shown in FIG. 1.
Figure 4:
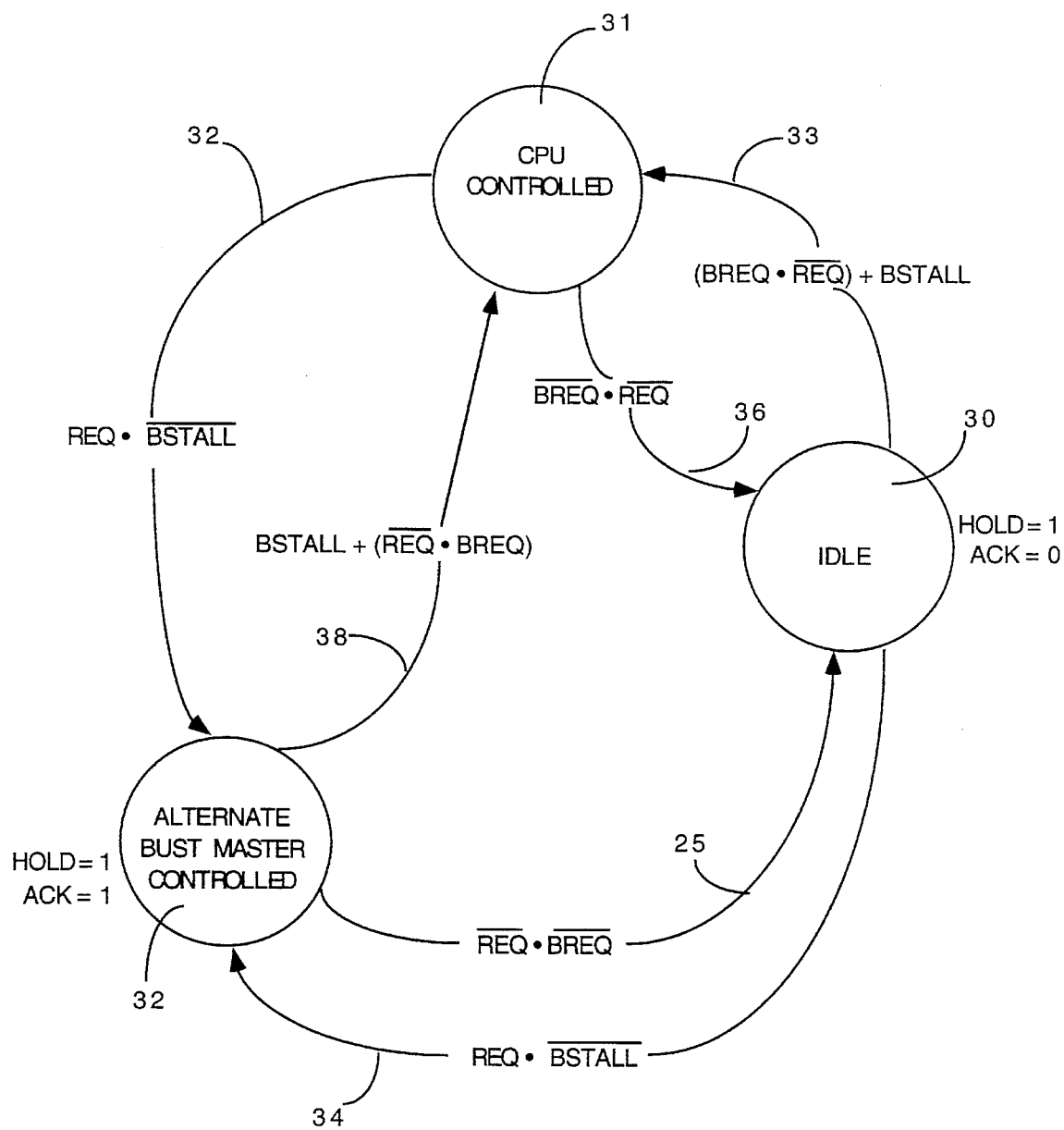
FIG. 4 is a state diagram of the operations of an external bus arbiter with respect to the bus arbitration communication scheme in FIG. 3.

Similar to the state diagram as shown in FIG. 2, the bus arbiter controls access to the external system bus 24 through a number of multistate microprocessor bus arbitration signals. As shown in FIG. 3, the bus arbiter 25 implemented in the present invention utilizes six bus arbitration signals, instead of five, to allocate access to the system bus: HOLD, HOLDA, BREQ, REQ, ACK and BSTALL. Such bus arbitration signals place the bus 24 into either the "Idle" state 30, the "CPU controlled" state 31 or the "Alternate Bus Master controlled" state 32, which are shown in FIG. 4. Each of these states has two state transitions represented by arrows 33, 34, 35, 36, 37 and 38, which are the only possible transitions in the next clock cycle from their respective states.

As discussed above, when neither the CPU 21 nor any of the at least one alternate bus masters 23, including the first alternate bus master 23a (such as a DMA device), requires access to the bus 24, the REQ 29a and BREQ 28c signals are inactive and the external system bus 24 is in an "Idle" state 30.

The bus arbiter 25 provides the CPU 21 access to the external system bus 24 from either the "Idle" state 30 or the "Alternate Bus Master controlled" state 32 when either of two conditions are met according to transitions 33 and 37. First, if BSTALL 28d is asserted, the bus arbiter 25 will immediately revoke access from the "Idle" state 30 or any alternate bus master 23 currently in control of the bus in order to immediately provide the CPU 21 access to the bus 24. A second condition is when the CPU 21 asserts the BREQ signal 28c and the REQ signal 29a is inactive indicating that another bus master does not require access to the bus 24.

According to the state diagram in FIG. 4, any alternate bus masters such as the first alternate bus master 23a, accesses the bus if BSTALL 28d is inactive and the REQ signal 29a is active as shown in transition 34 and 36. Such condition indicates that either the CPU 21 is accessing the bus to service non-urgent bus requests (i.e., BSTALL="0" and BREQ="1") or the bus is in the "Idle" state 30.

The operation of the present invention may best be understood by providing a specific example showing a CPU relinquishing control of the system bus and requesting access to the same by asserting an active BREQ and BSTALL signal 28c and 28d. As previously mentioned herein, this specific example lends itself to explaining the operation of the present invention and in no way should be construed as a limitation on the scope of the invention.

Figure 5A:
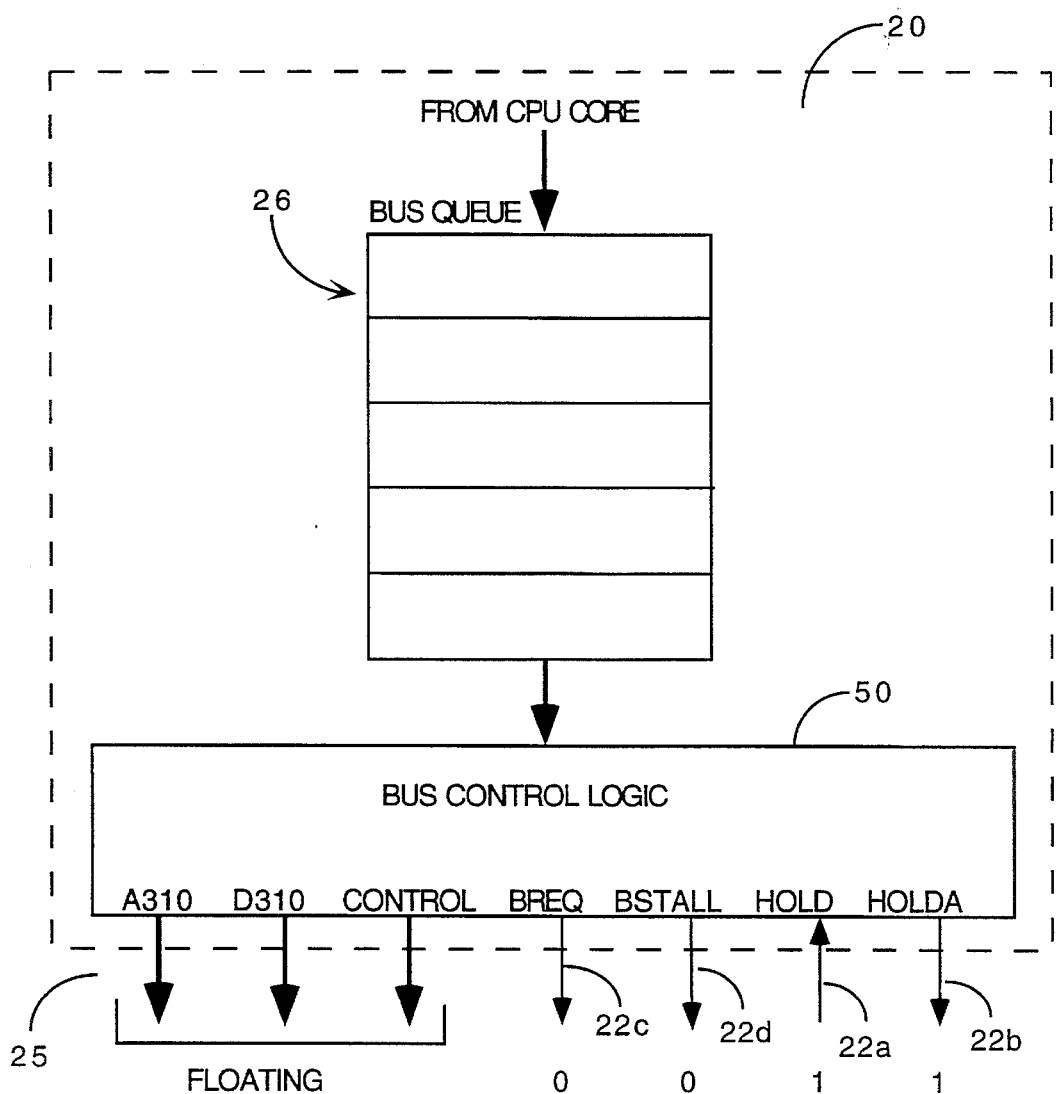
FIG. 5a is an illustration of the bus queue and bus control logic of a processor incorporating the present invention when an alternate bus master has access to the system bus.

FIG. 5a shows a CPU 21 having an internal bus queue 27 and internal data/instruction cache 26. The bus queue 27 is illustrated to be able to store five requests, but it simply needs to be able to store at least one request. As shown here, there are no requests in the bus queue 27. The CPU 21 is currently either in an "Idle state" 30 or a "Alternate Bus Master controlled" state 32 because both HOLD and HOLDA signals are asserted where it does not require access to the system bus. (HOLD="1", HOLDA="1"). As a result, as mentioned above, the address, data and control pins are floating. The bus control logic 40 is merely a common interface between the CPU 21 and the system bus 24 which receives, stores and outputs signal values.

Figure 5B:
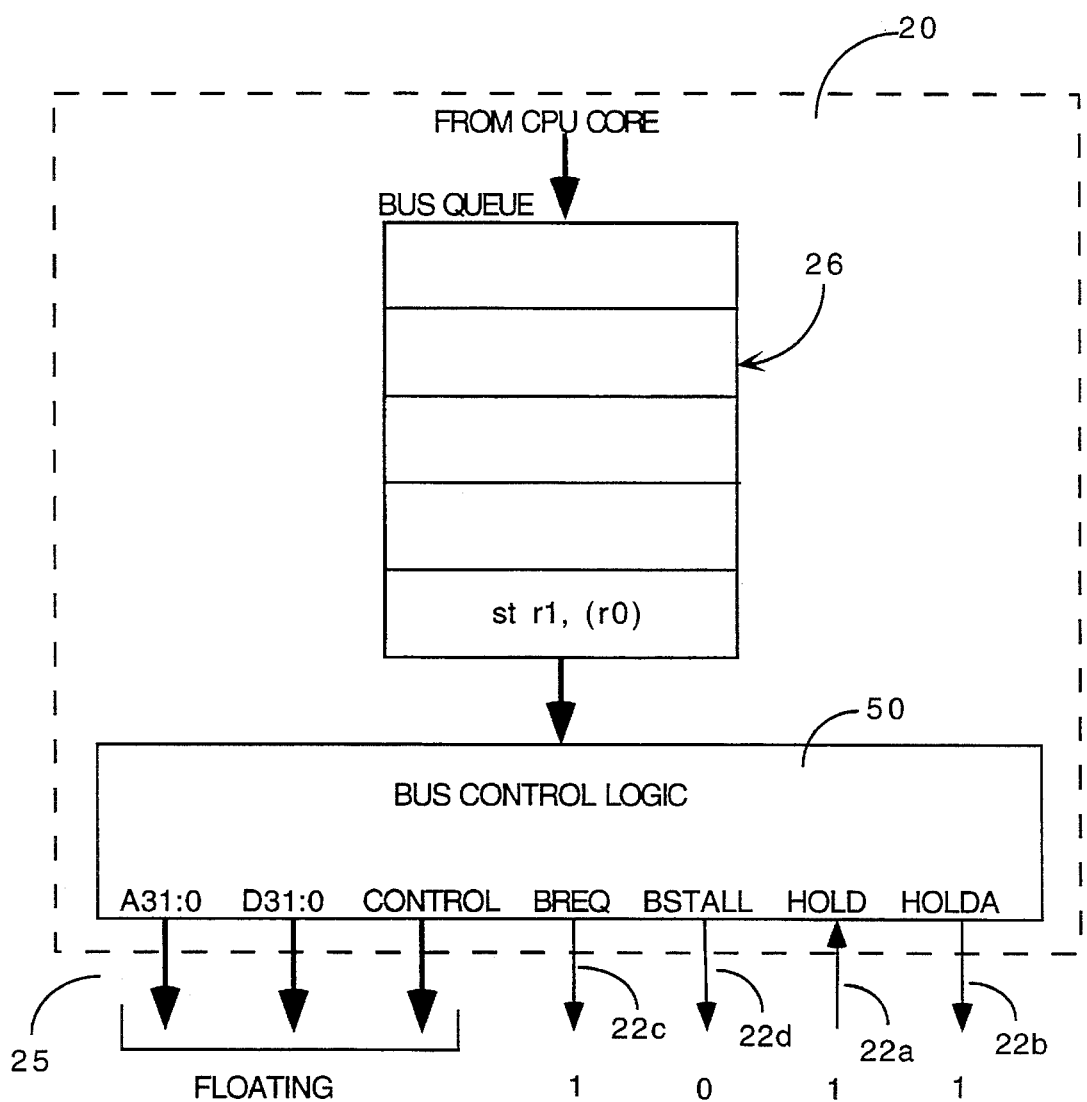
FIG. 5b is an illustration of the bus queue and bus control logic of a processor incorporating the present invention when the alternate bus master has access to the system bus and the CPU requests access to the system bus to store the contents of CPU register "r1" into the memory location pointed to by the value in CPU register "r0".

FIG. 5b shows the CPU requesting access to the system bus in order to store the contents of a CPU register "r1" in a memory location pointed to by the value in CPU register "r0". As a result, the request is stored in the internal bus queue 27 and the BREQ 28c signal is activated. However, since that the next instruction does not rely on the result of the store instruction, the bus request does not require immediate access to the system bus. Thus, the BSTALL signal 28d remains inactive thereby allowing another bus master to continue using the system bus.

Figure 5C:
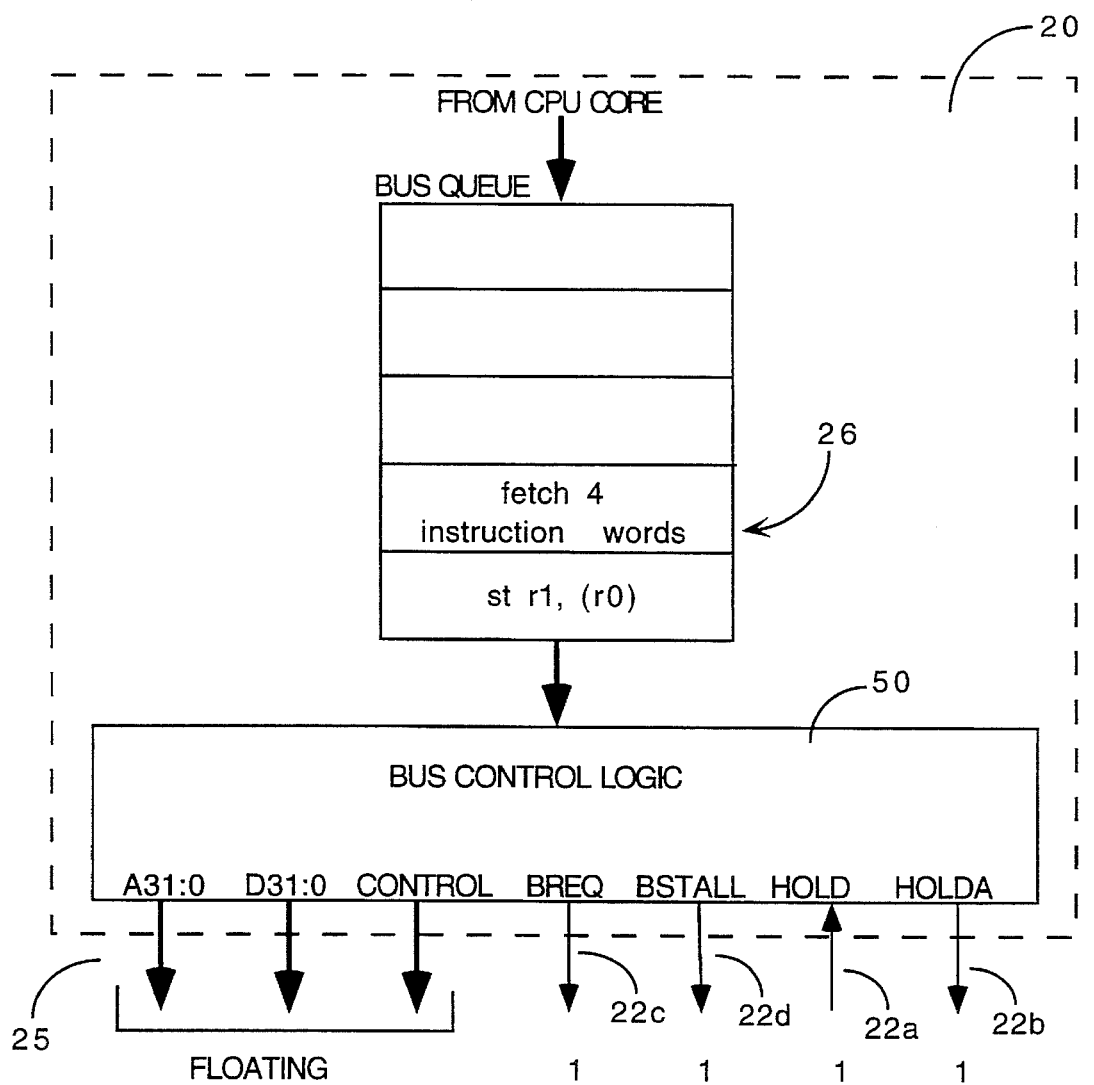
FIG. 5c is an illustration of the bus queue and bus control logic of a processor incorporating the present invention when the alternate bus master has control of the system bus and the CPU requests access to the system bus because of an instruction cache miss.
Figure 5D:
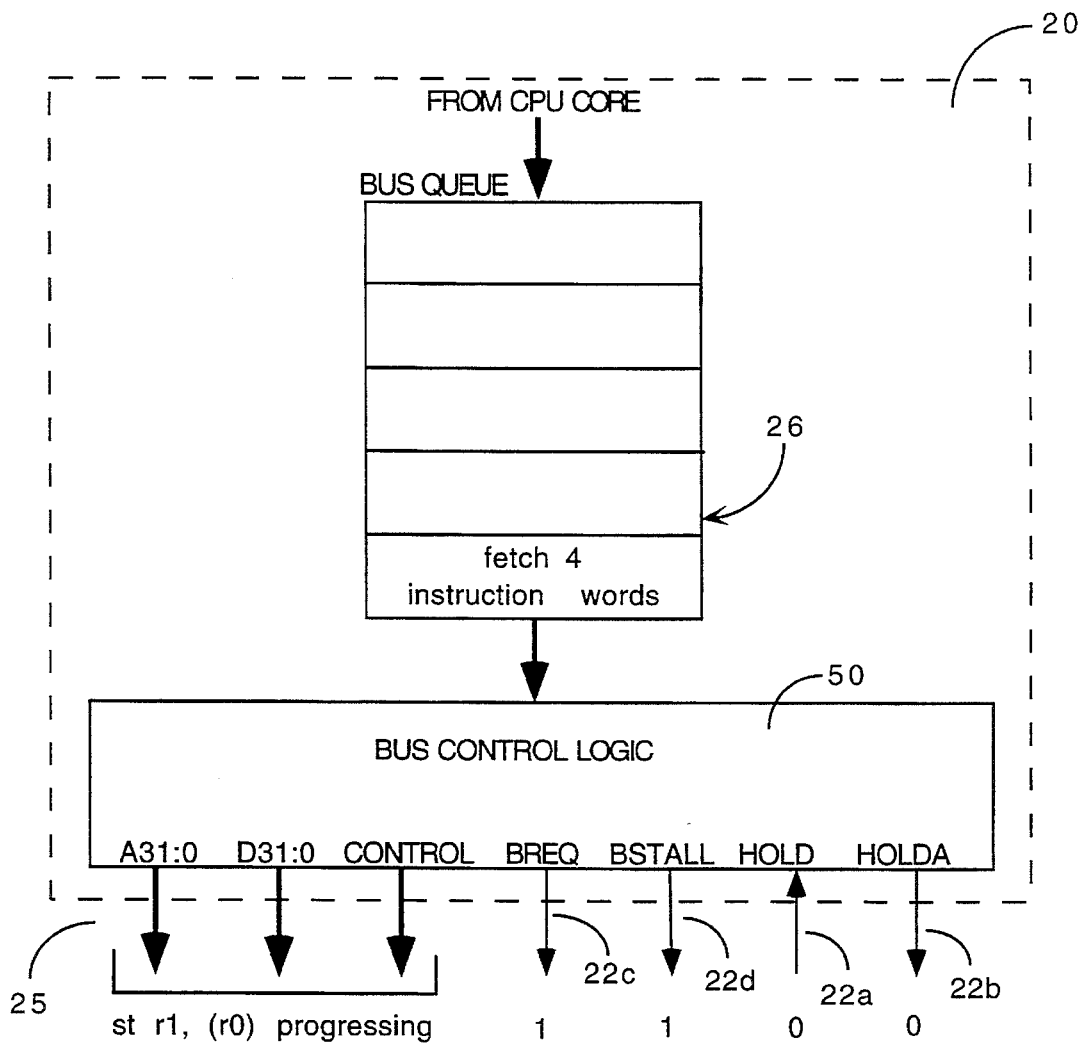
FIG. 5d is an illustration of the bus queue and bus control logic of a processor incorporating the present invention when the CPU has regained control of the system bus and is in the process of storing the contents of local register "r1" into the memory location pointed to by the value in local register "r0".

Referring to FIG. 5c, the CPU 21 has continued to execute code from its cache 26 and has encountered an instruction cache miss. Since the CPU 21 cannot continue to execute code from the cache until it has fetched four words from the external main memory 22, the request is placed in the internal bus queue 27 and the BSTALL signal 28d is activated. The bus arbiter 25 then allows the CPU 21 back onto the system bus 24 by deasserting the HOLD 28a as shown in FIG. 5d. If the system follows a First-In, First-Out ("FIFO") queue servicing protocol, the first request is processed in the next clock cycle so that the bus request for servicing the instruction cache miss is still in queue causing the BSTALL signal 28d to remain active.

Figure 5E:
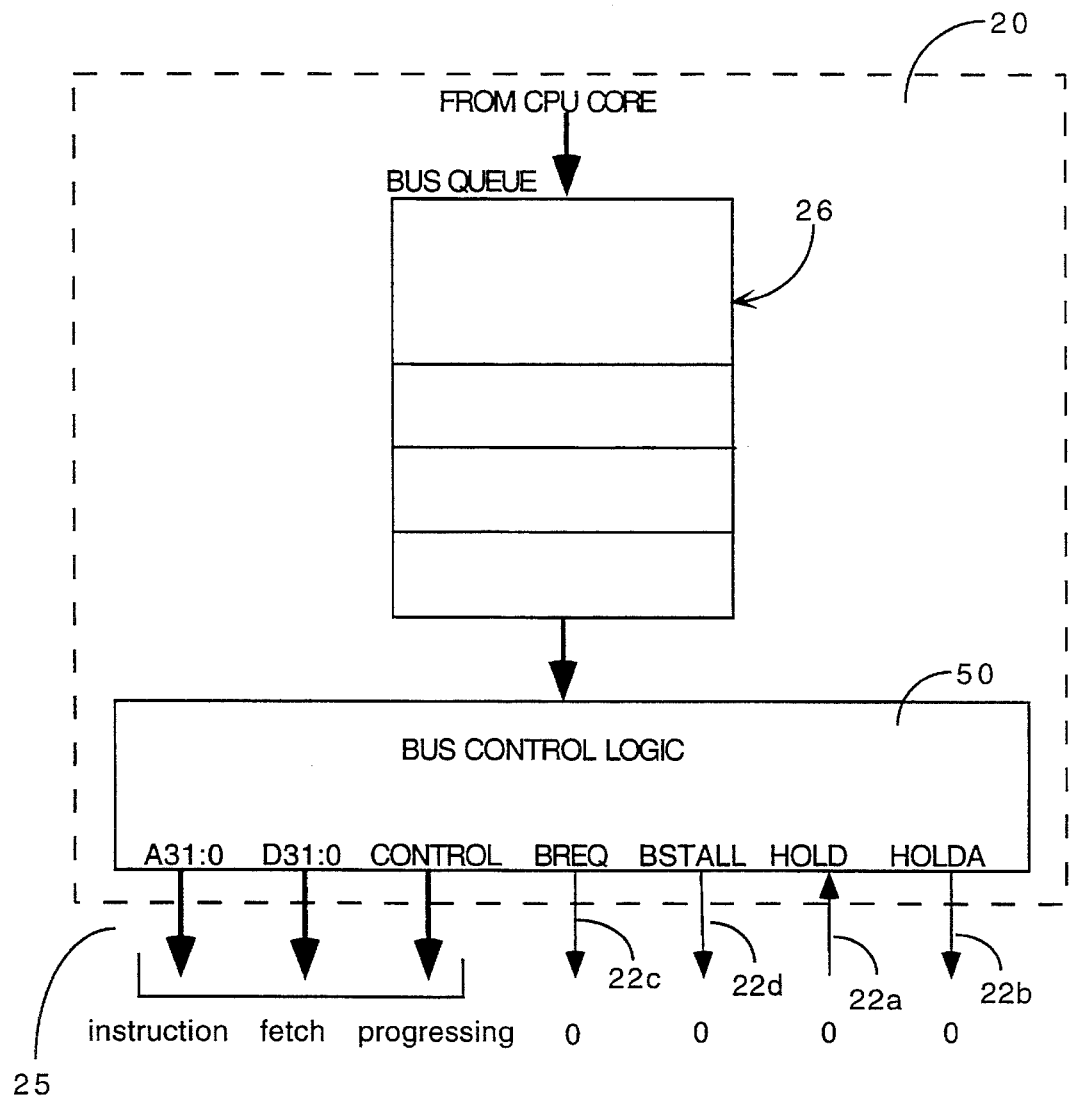
FIG. 5e is an illustration of the bus queue and bus control logic of a processor incorporating the present invention after such processor has regained control of the system bus and is in the process of fetching four instruction words from external memory due to an instruction cache miss.

In FIG. 5e, the CPU still has access to the system bus since the instruction cache miss is now being serviced. Upon servicing the bus request, the BSTALL signal 28d is deactivated, the BREQ signal is also deactivated because the internal bus queue 27 is empty.

Figure 5F:
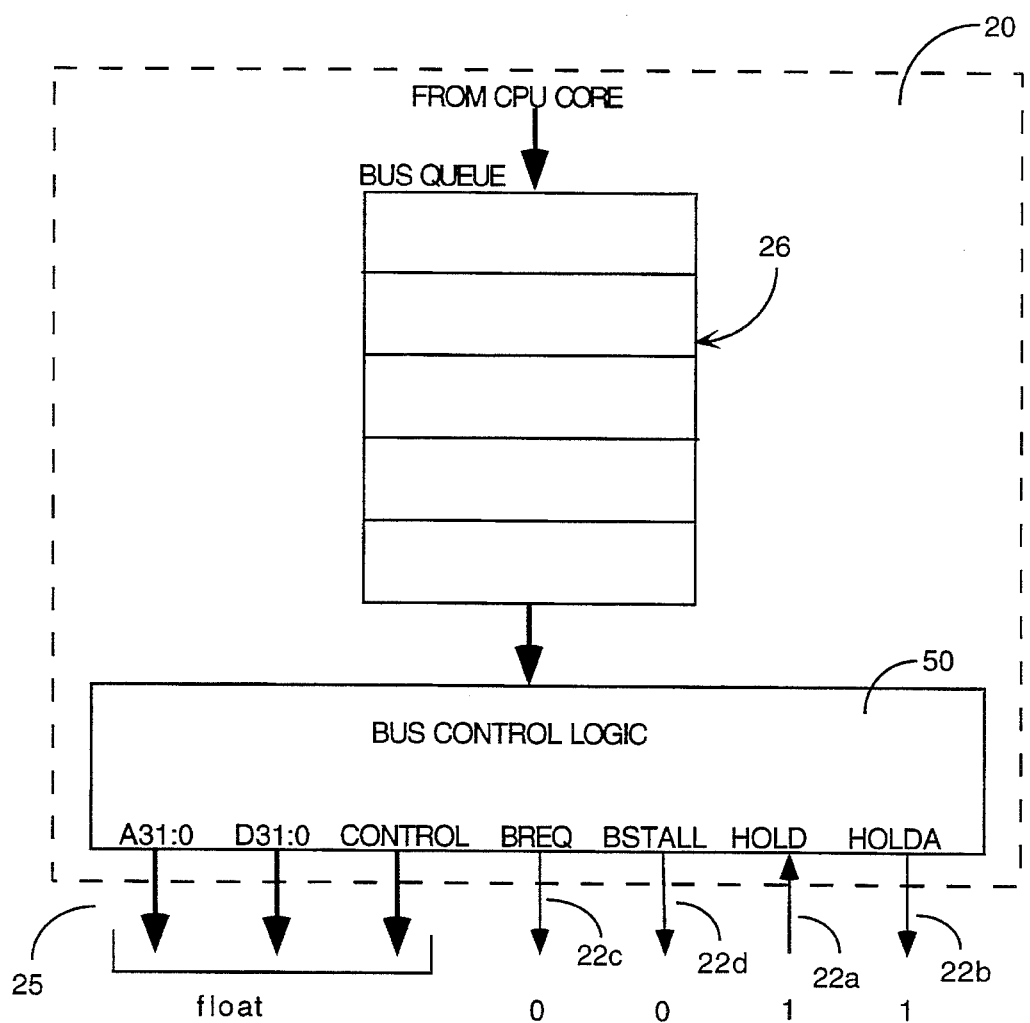
FIG. 5f is an illustration of the bus queue and bus control logic of a processor incorporating the present invention when the alternate bus master has requested access to the system bus.

FIG. 5f shows the bus arbiter 25 finding that the CPU 21 is no longer stalled and thereby activates the HOLD signals and receives an active HOLDA signal in order to place the bus it in an "Idle state" 30 until the CPU 21 or any other bus master requests access to the system bus.

Figure 6:
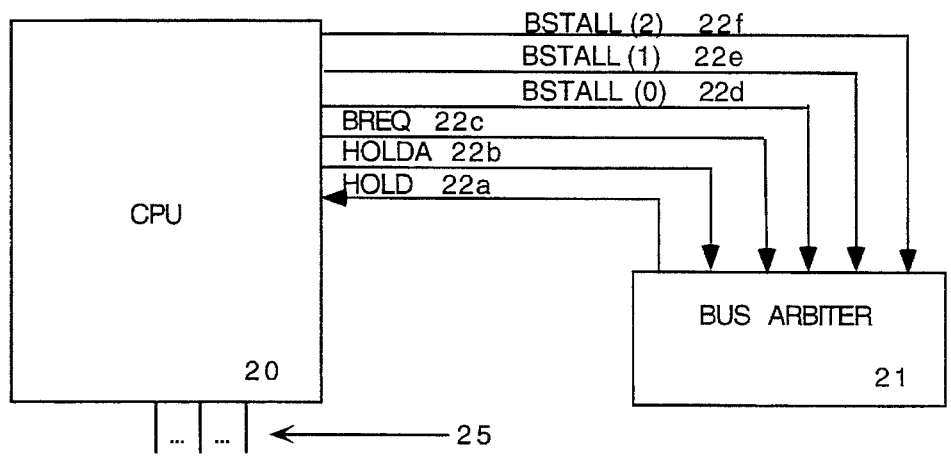
FIG. 6 is a block diagram of a second embodiment of the present invention.

The second embodiment of the present invention, as shown in FIG. 6, illustrates an arbitration signal BSTALL to indicate that the CPU 21 has stalled and a plurality of microprocessor bus arbitration signals 28e–28f to provide the bus arbiter 25 with the number of bus requests that are in the bus queue 27. For example, FIG. 6 shows a BSTALL signal in combination with three microprocessor bus arbitration signals referred to as "BNUM" 28e–28g in order to indicate that there exists 0–7 bus requests in the internal bus queue 27. Such an embodiment would provide the bus arbiter 25 with more information concerning the status of the CPU 21, and thus, enable the bus arbiter 25 to better allocate the system bus 24 according to true need.

Figure 7:
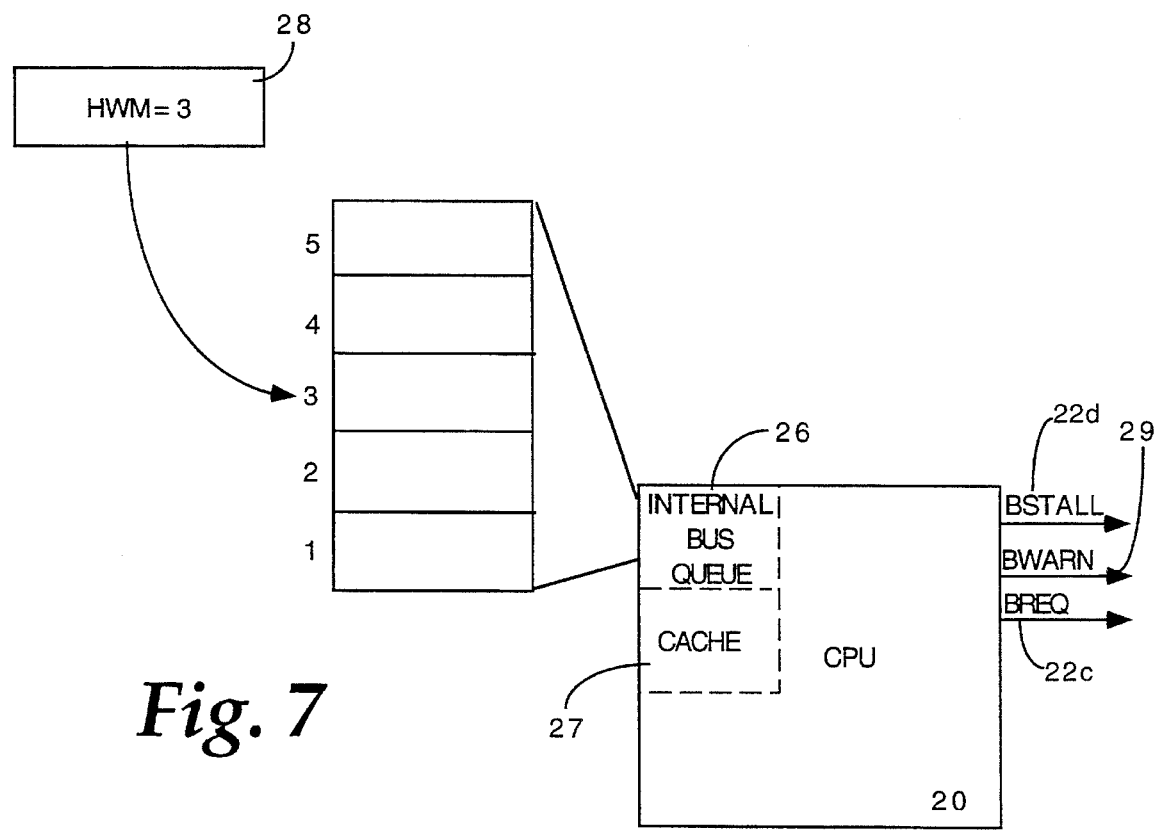
FIG. 7 is a block diagram of a third embodiment of the present invention.

As shown in FIG. 7, a third embodiment would be to implement a programmable "high-water mark" for the internal bus queue 17. A programmable high-water mark is essentially a programmable register 41 which indicates through a signal line that the bus queue 27 has a certain number of requests placed therein. In FIG. 7, the high-water mark is set to three bus requests so as to cause an additional microprocessor bus arbitration signal, BWARN 42, to signal the bus arbiter 25 that at least three bus requests are in the internal bus queue 27. The BWARN signal 42 thereby provides the arbiter 25 with an additional indicator that the bus queue 27 may be filled shortly and access to the system bus by the CPU 21 is strongly encouraged before the CPU 21 stalls due to bus queue overrun.

Figure 8:
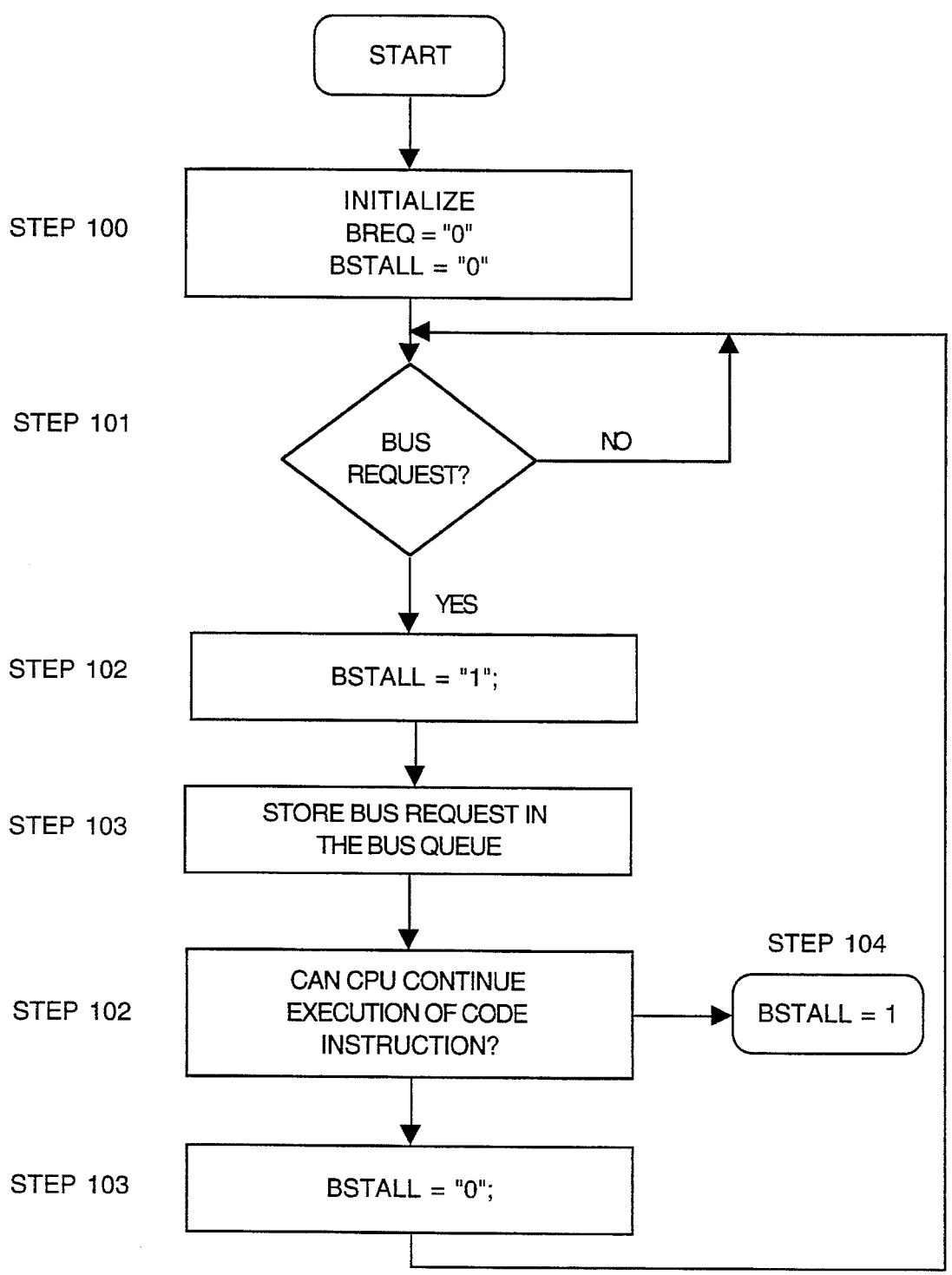
FIG. 8 is a flow chart of the method of operation of the multistate microprocessor bus arbitration signals shown in FIG. 3.

The following is a detailed description of the operations of the bus arbitration communication scheme pursuant to a particular design of the embodiment in FIG. 3. As shown in the flow chart in FIG. 8, in Step 100, the multistate microprocessor bus arbitration signals are initialized since the internal bus queue is empty internal bus queue (BREQ="0") and the CPU is not stalled (BSTALL="0"). In Step 101, while the CPU executes a code instruction, it monitors whether it requires access to the external system bus in order to obtain data from an external device, such as main memory (i.e., whether the instruction cache or another internal memory module has sufficient data to execute the code instruction). If there is sufficient data within the cache to execute the code instruction, the CPU executes the code instruction and repeats step 101 for the next code instruction. On the other hand, if the cache does not have sufficient information to execute the instruction, bus access is needed. The BREQ signal is activated (Step 102).

The CPU stores the bus request in the bus queue awaiting access to the bus (Step 103). The CPU then monitors the next code instruction to determine whether it can be executed without information dependent on the prior instruction (Step 104). If so, the BSTALL signal is not activated and the same procedure is done on the next code instruction (Step 105). However, if the CPU becomes stalled (i.e., it cannot execute subsequent code instructions until a prior code instruction is executed or the bus queue has overrun), the CPU activates the BSTALL signal line requesting the bus arbiter to immediately transfer control of the system bus over to the CPU (Step 106).

Figure 9:
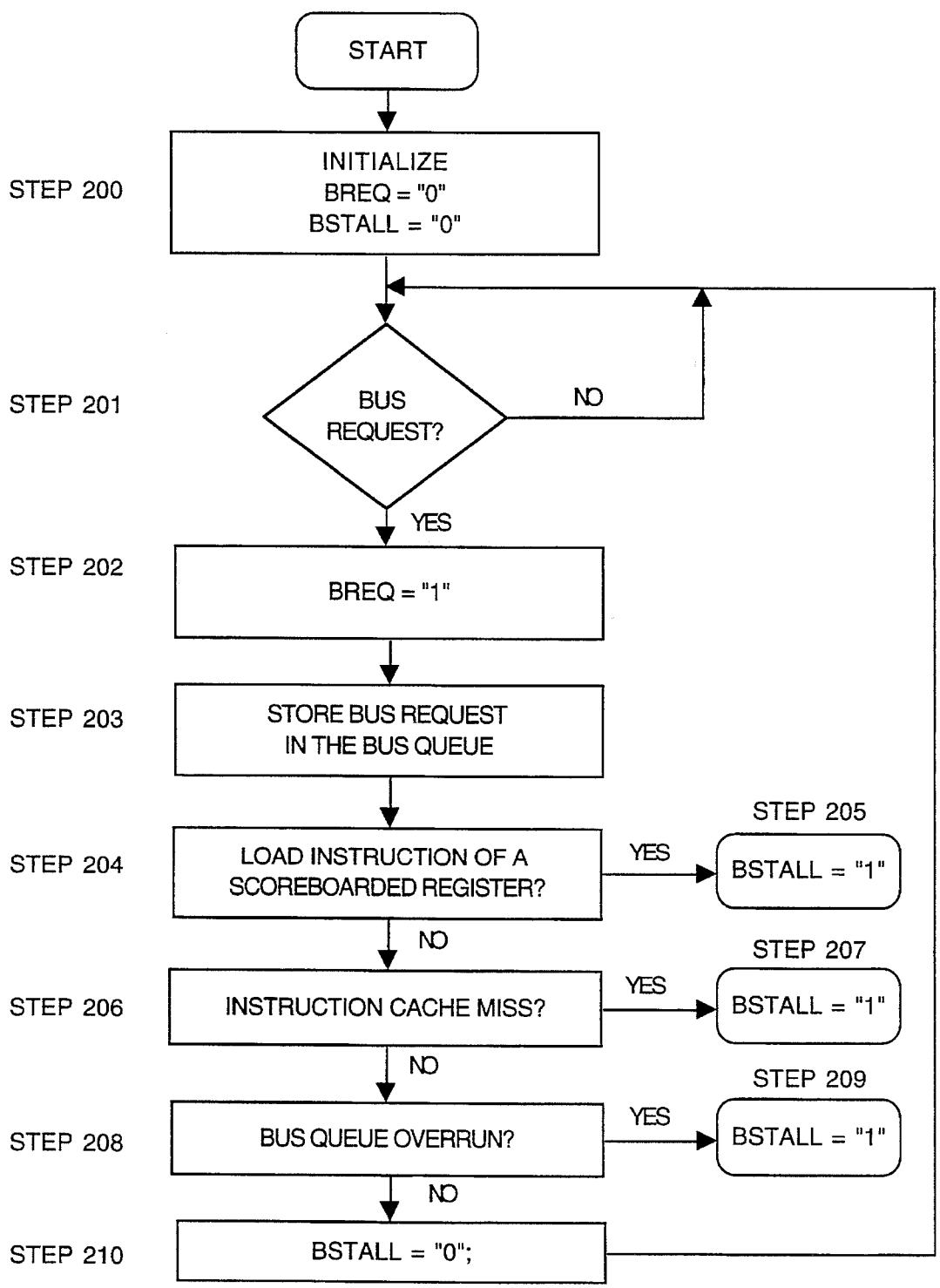
FIG. 9 is a flow chart of the method of operation of the multistate microprocessor bus arbitration signals shown in FIG. 3 including examples of when the BSTALL signal is activated.

FIG. 9 illustrates a more detailed flow chart showing five steps used to determine whether BSTALL is activated. However, the activation of BSTALL is not limited to the above five steps but can be programmed or wired to activate when any of a number of conditions are met. As in FIG. 8, Steps 110–113 are identical to Steps 100–103. However, once the CPU has determined that the cache or other internal memory module 16 does not have sufficient information to execute the code instruction, the CPU then determines whether the code instruction is a load instruction of a scoreboarded register (Step 114). If so, the BSTALL signal is activated (Step 115); otherwise, the BSTALL remains inactive and the CPU determines whether the instruction is an instruction cache miss (Step 116). If so, BSTALL is activated (Step 117) and if not, BSTALL remains inactive and a third condition is checked in Step 118; namely, whether the bus queue is full (i.e., BREQ>bus queue size) and the CPU has generated another request. If the bus queue is not overrun, the BREQ signal remains activated and the bus request is loaded into the integral bus queue and the process continues from step 111.

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follow.

What we claim is:

1. A multi-master bus system comprising:

bus means for transferring information;

means for controlling access to said bus means;

means for storing at least said information, said storing means being coupled to said bus means;

means for processing at least a first and second instructions to perform a specific operation within said multi-master bus system, said processing means being coupled to said bus means and said controlling means, wherein said processing means includes means for temporarily storing said information to enable said processing means to process at least one of said first and second instructions, said information being fetched from said storing means, means for queuing at least a bus request associated with said first instruction if said information within said temporary storing means is not sufficient for said processing means to process said first instruction, and means for signaling said controlling means to grant said processing means access to said bus means, wherein said signaling means propagates a plurality of microprocessor bus arbitration signals, said plurality of microprocessor bus arbitration signals being at least a second microprocessor bus arbitration ("BSTALL") signal indicating whether said processing means requires immediate access to said bus means, wherein said at least a second microprocessor bus arbitration signal is asserted to indicate to said controlling means that said processing means requires immediate access to said bus means in order to obtain information necessary to process said first instruction, and at least a first microprocessor bus arbitration ("BREQ") signal indicating whether said processing means requires access to said bus means, wherein said at least a first microprocessor bus arbitration signal is asserted and said at least a second microprocessor bus arbitration signal is deasserted if said processing means can process said second instruction without prior processing of said first instruction; and means for accessing said bus means in order to transfer data through said bus means, said accessing means, coupled to said bus means and to said controlling means, (i) gaining access to said bus means by asserting a bus request and said processing means is not asserting said at least a second microprocessor bus arbitration signal and (ii) relinquishing access to said processing means when said processing means asserts said at least a second microprocessor bus arbitration signal.

2. The multi-master bus system according to claim 1, wherein said accessing means comprises at least one alternate bus master.

3. The processing means according to claim 1, wherein signaling means comprises at least one pin implemented into said processing means.

4. The processing means according to claim 1, wherein said signaling means further generates at least a third microprocessor bus arbitration signal to indicate that said queuing means within said processing means contains a predetermined number of bus requests therein.

5. The processing means according to claim 4, wherein said predetermined number is stored in a programmable register.

6. A multi-master bus system comprising:

a bus;

a bus arbiter to control access to said bus;

at least one main memory module coupled to said bus for storing information;

at least one microprocessor, coupled to said bus and to said bus arbiter, for executing at least a first and second instructions to perform a specific operation within said multi-master bus system, wherein said at least one microprocessor includes a memory module for storing information to enable said at least one microprocessor to execute at least one of said at least a first and second instructions, an internal bus queue for queuing a bus request associated with said first instruction if said information is insufficient for said at least one microprocessor to process said first instruction, and at least one pin operating in combination with a plurality of signal lines for providing a plurality of microprocessor bus arbitration signals to said bus arbiter in order for said at least one microprocessor to obtain access to said bus, said plurality of microprocessor bus arbitration signals being at least a second microprocessor bus arbitration ("BSTALL") signal indicating whether said at least one microprocessor requires immediate access to the bus, wherein said at least a second microprocessor bus arbitration signal is asserted to indicate to said bus arbiter that said at least one microprocessor requires immediate access to said bus in order to obtain information necessary to process said first instruction, and at least a first microprocessor bus arbitration signal indicating whether said at least one microprocessor requires access to the bus, wherein said at least a first microprocessor bus arbitration signal is asserted and said at least a second microprocessor bus arbitration signal is deasserted if said at least one microprocessor can process said second instruction without prior processing of said first instruction; and at least one alternate bus master, coupled to said bus and to said bus arbiter, gaining access to said bus by asserting a bus request and said at least one microprocessor is not asserting said at least a second microprocessor bus arbitration signal and relinquishing access to said at least one microprocessor when said at least one microprocessor asserts said at least second microprocessor bus arbitration signal.

7. The multi-master bus system according to claim 6, wherein said at least one pin of said at least one microprocessor further provides a third microprocessor bus arbitration signal to indicate that said bus queue within said at least one microprocessor contains a predetermined number of bus requests therein.

8. The multi-master bus system according to claim 7, wherein said at least one microprocessor includes a programmable register to store said predetermined number.

9. A method for increasing efficiency of a multi-master bus system by using a plurality of microprocessor bus arbitration signals between at least one microprocessor and a bus arbiter to assist said bus arbiter in controlling access to a bus between said at least one microprocessor and at least one alternate bus master, said plurality of microprocessor bus arbitration signals being at least a first microprocessor bus arbitration ("BREQ") signal indicating whether said at least one microprocessor requires access to the bus, and at least a second microprocessor bus arbitration ("BSTALL") signal indicating whether said at least one microprocessor requires immediate access to the bus, said method comprising the steps of:

gaining access to said bus by said at least one alternate bus master asserting a bus request while said at least one microprocessor is not asserting said at least a second microprocessor bus arbitration signal;

activating said at least a first microprocessor bus arbitration signal if said at least one microprocessor requires access to the bus in order to obtain information necessary to execute a first code instruction;

loading said first code instruction into a bus queue; and monitoring a second code instruction to determine whether said at least one microprocessor can execute said second code instruction before executing said first code instruction, wherein (1) executing said second code instruction if said at least one microprocessor can execute said second code instruction before executing said first code instruction, or alternatively (2a) activating said at least a second microprocessor bus arbitration signal to indicate to said bus arbiter that said at least one microprocessor requires immediate access to said bus, provided said at least one microprocessor cannot execute said second code instruction before executing said first code instruction, (2b) relinquishing ownership of said bus by said at least one alternate bus master when said at least one microprocessor asserts said at least a second microprocessor bus arbitration signal, (2c) receiving ownership of said bus from said bus arbiter, and (2d) executing said first code instruction.

* * * * *

UNITED STATES PATENT AND TRADEMARK OFFICE
CERTIFICATE OF CORRECTION

| | | |
|---|---|---|
| PATENT NO. | : | 5,475,850 |
| DATED | : | December 12, 1995 |
| INVENTOR(S) | : | Kahn |

It is certified that error appears in the above-identified patent and that said Letters Patent is hereby corrected as shown below:

In column 11, at line 3, insert --a-- between "least" and "second".

Signed and Sealed this

Third Day of December, 1996

Attest:

BRUCE LEHMAN

Attesting Officer

Commissioner of Patents and Trademarks